(12) United States Patent
Lang et al.

(10) Patent No.: US 12,482,525 B2
(45) Date of Patent: Nov. 25, 2025

(54) APPARATUS WITH MULTI-DECK READ LEVEL MANAGEMENT AND METHODS FOR OPERATING THE SAME

(71) Applicant: Micron Technology, Inc., Boise, ID (US)

(72) Inventors: Murong Lang, San Jose, CA (US); Tingjun Xie, Milpitas, CA (US); Fangfang Zhu, San Jose, CA (US); Jiangli Zhu, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 186 days.

(21) Appl. No.: 17/938,153

(22) Filed: Oct. 5, 2022

(65) Prior Publication Data

US 2023/0395162 A1 Dec. 7, 2023

Related U.S. Application Data

(60) Provisional application No. 63/347,896, filed on Jun. 1, 2022.

(51) Int. Cl.
*G11C 11/4074* (2006.01)
*G11C 16/10* (2006.01)
*G11C 16/12* (2006.01)
*G11C 16/26* (2006.01)
*G11C 5/14* (2006.01)
*G11C 11/4099* (2006.01)

(52) U.S. Cl.
CPC ............ *G11C 16/26* (2013.01); *G11C 16/102* (2013.01); *G11C 16/12* (2013.01)

(58) Field of Classification Search
CPC ....... G11C 16/26; G11C 16/102; G11C 16/12; G11C 16/08; G11C 16/0483; G11C 16/3404; G11C 16/3418; G11C 11/5642; G11C 16/32
USPC .................................................. 365/189.011
See application file for complete search history.

(56) References Cited

U.S. PATENT DOCUMENTS

| | | | |
|---|---|---|---|
| 2019/0043594 A1* | 2/2019 | Zhao | G11C 11/5628 |
| 2021/0286556 A1* | 9/2021 | Kim | G06F 11/1048 |
| 2022/0044737 A1* | 2/2022 | Khayat | G11C 11/5642 |
| 2022/0165741 A1* | 5/2022 | Xie | H10B 43/27 |

* cited by examiner

*Primary Examiner* — Alexander Sofocleous
*Assistant Examiner* — James S Wells
(74) *Attorney, Agent, or Firm* — Dorsey & Whitney LLP

(57) ABSTRACT

Methods, apparatuses and systems related to managing read levels across multiple groupings or decks are described. The apparatus may include a read level management mechanism configured to controls or dynamically adjusts the read levels for the different groupings according to a real-time condition/measure associated with the programming delays.

17 Claims, 6 Drawing Sheets

APPARATUS WITH MULTI-DECK READ LEVEL MANAGEMENT AND METHODS FOR OPERATING THE SAME

CROSS-REFERENCE TO RELATED APPLICATION(S)

This application claims benefit of U.S. Provisional Application No. 63/347,896, filed Jun. 1, 2022; the subject matter thereof is incorporated herein by reference thereto. This application also contains subject matter related to a U.S. Patent Application by Murong Lang, Tingjun Xie, Fangfang Zhu, Jiangli Zhu, and Zhenming Zhou titled "APPARATUS WITH TIME-BASED READ LEVEL MANAGEMENT AND METHODS FOR OPERATING THE SAME." The related application is assigned to Micron Technology, Inc., and is identified by U.S. Provisional Application No. 63/347,876 filed Jun. 1, 2022.

TECHNICAL FIELD

The disclosed embodiments relate to devices, and, in particular, to semiconductor memory devices with read level management and methods for operating the same.

BACKGROUND

Memory systems can employ memory devices to store and access information. The memory devices can include volatile memory devices, non-volatile memory devices (e.g., flash memory employing "NAND" technology or logic gates, "NOR" technology or logic gates, or a combination thereof), or a combination device. The memory devices utilize electrical energy, along with corresponding threshold levels or processing/reading voltage levels, to store and access data. However, the performance or characteristics of the memory devices change or degrade over time or usage. The change in performance or characteristics conflicts with the threshold or processing voltage levels over time, leading to errors and other performance issues.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
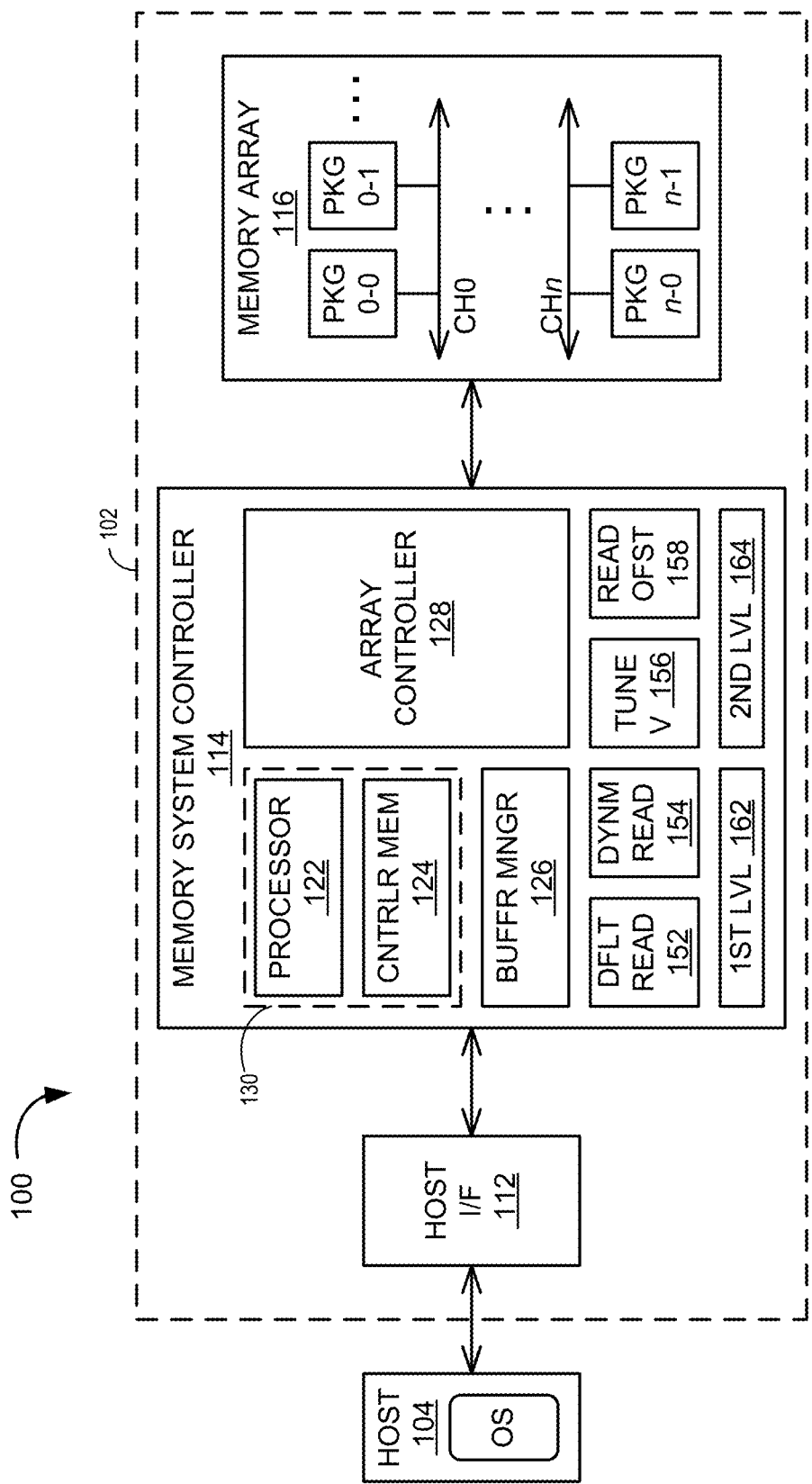
FIG. 1 is a block diagram of a computing system in accordance with an embodiment of the present technology.

As described in greater detail below, the technology disclosed herein relates to an apparatus, such as memory systems, systems with memory devices, related methods, etc., for managing read levels. A computing system, such as an enterprise computer, a server, a distributed computing system, or the like, may include a memory device configured to store data into different portions at different times.

As an illustrative example, the computing system can include the memory system having a three-dimensional (3D) NAND architecture. Such memory system can have memory cells organized in multiple layers. In some embodiments, word-lines used to access the memory cells can be arranged parallel to the layers (e.g., extending laterally) and bit lines can be arranged orthogonal to the orientation of the layers (e.g., extending vertically). The layers can be grouped into decks (groupings of, e.g., 48, 88, or 96 word lines), which may be written to at different times. For example, the memory system may have the memory cells arranged in two groupings (e.g., an upper deck and a lower deck). For one block of memory, half of the cells in one grouping (e.g., the lower deck) may be programmed before other groupings (e.g., the upper deck). The targeted memory block may remain open until the remaining groupings are programmed, such as after a delay. As the programming delay increases, the differences in the stored charges of the different decks can also increase, which can cause imbalances in reading the stored data. For example, for a given read voltage, the initially programmed cells (e.g., the lower deck) may produce higher error rates than the subsequently programmed cells.

To improve the balance across the different groupings of memory cells, embodiments of the technology described herein may include a read level management mechanism that controls or dynamically adjusts the read levels for the different groupings according to a real-time condition/measure associated with the programming delays. In some embodiments, the memory system (via, e.g., an array controller and/or circuits within a memory array) can determine different read levels using a default read level, a dynamic read level, an offset level, and/or a fine-tuning level. The different read levels can be used to the different groupings of the memory cells. For example, the memory system can use different read levels for reading from the upper and lower decks.

The memory system can use the different and/or dynamically adjusted read levels to read the different groupings, and thus provide improved data integrity (e.g., lower error rates) and reduce error recovery trigger rates. Moreover, the memory system leverage existing background reads and/or existing internal processes in implementing the different read levels, thereby maintaining performance measures, such as the Quality of Service (QoS) parameter.

For illustrative purposes, the memory system will be described using a two-deck architecture (e.g., having lower and upper decks). However it is understood that the memory system can include three or more decks, and the memory system can use different read levels for one or more or each of the decks. Also, for illustrative purposes, the memory system will be described as programming the lower deck before the upper deck. However, it is understood that the memory system can program the decks in different sequences and apply the different read levels according to the programming sequence.

Example Environment

FIG. 1 is a block diagram of a computing system 100 in accordance with an embodiment of the present technology. The computing system 100 can include a personal computing device/system, an enterprise system, a mobile device, a server system, a database system, a distributed computing system, or the like. The computing system 100 can include a memory system 102 coupled to a host device 104. The host device 104 can include one or more processors that can write data to and/or read data from the memory system 102, such as during execution of an operating system. For example, the host device 104 can include an upstream central processing unit (CPU).

The memory system 102 can include circuitry configured to store data (via, e.g., write operations) and provide access to stored data (via, e.g., read operations). For example, the memory system 102 can include a persistent or non-volatile data storage system, such as a NAND-based Flash drive system, a Solid-State Drive (SSD) system, a SD card, or the like. In some embodiments, the memory system 102 can include a host interface 112 (e.g., buffers, transmitters, receivers, and/or the like) configured to facilitate communications with the host device 104. For example, the Host interface 112 can be configured to support one or more host interconnect schemes, such as Universal Serial Bus (USB), Peripheral Component Interconnect (PCI), Serial AT Attachment (SATA), or the like. The host interface 112 can receive commands, addresses, data (e.g., write data), and/or other information from the host device 104. The host interface 112 can also send data (e.g., read data) and/or other information to the host device 104.

The memory system 102 can further include a memory system controller 114 and a memory array 116. The memory array 116 can include memory cells that are configured to store a unit of information. The memory system controller 114 can be configured to control the overall operation of the memory system 102, including the operations of the memory array 116.

In some embodiments, the memory array 116 can include a set of NAND Flash devices or packages. Each of the packages can include a set of memory cells that each store data in a charge storage structure. The memory cells can include, for example, floating gate, charge trap, phase change, ferroelectric, magnetoresistive, and/or other suitable storage elements configured to store data persistently or semi-persistently. The memory cells can be one-transistor memory cells that can be programmed to a target state to represent information. For instance, electric charge can be placed on, or removed from, the charge storage structure (e.g., the charge trap or the floating gate) of the memory cell to program the cell to a particular data state. The stored charge on the charge storage structure of the memory cell can indicate a threshold voltage (Vt) of the cell. For example, a single level cell (SLC) can be programmed to a targeted one of two different data states, which can be represented by the binary units 1 or 0. Also, some flash memory cells can be programmed to a targeted one of more than two data states. Multilevel cells (MLCs) may be programmed to any one of four data states (e.g., represented by the binary 00, 01, 10, 11) to store two bits of data. Similarly, triple level cells (TLCs) may be programmed to one of eight (i.e., $2^3$) data states to store three bits of data, and quad level cells (QLCs) may be programmed to one of 16 (i.e., $2^4$) data states to store four bits of data.

Such memory cells may be arranged in rows (e.g., each corresponding to a word line 143) and columns (e.g., each corresponding to a bit line). The arrangements can further correspond to different groupings for the memory cells. For example, each word line can correspond to one or more memory pages. Also, the memory array 116 can include memory blocks that each include a set of memory pages. In operation, the data can be written or otherwise programmed (e.g., erased) with regards to the various memory regions of the memory array 116, such as by writing to groups of pages and/or memory blocks. In NAND-based memory, a write operation often includes programming the memory cells in selected memory pages with specific data values (e.g., a string of data bits having a value of either logic 0 or logic 1). An erase operation is similar to a write operation, except that the erase operation re-programs an entire memory block or multiple memory blocks to the same data state (e.g., logic 0).

While the memory array 116 is described with respect to the memory cells, it is understood that the memory array 116 can include other components (not shown). For example, the memory array 116 can also include other circuit components, such as multiplexers, decoders, buffers, read/write drivers, address registers, data out/data in registers, etc., for accessing and/or programming (e.g., writing) the data and for other functionalities.

As described above, the memory system controller 114 can be configured to control the operations of the memory array 116. The memory system controller 114 can include a processor 122, such as a microcontroller, special purpose logic circuitry (e.g., a field programmable gate array (FPGA), an application specific integrated circuit (ASIC), etc.), or other suitable processor. The processor 122 can execute instructions encoded in hardware, firmware, and/or software (e.g., instructions stored in controller embedded memory 124 to execute various processes, logic flows, and routines for controlling operation of the memory system 102 and/or the memory array 116.

In some embodiments, the memory system controller 114 can include a buffer manager 126 configured to control and/or oversee information exchanged with the host device 104. The buffer manager 126 can interact with the host interface 112 regarding operations of receiving and/or transmitting buffers therein.

Further, the memory system controller 114 can further include an array controller 128 that controls or oversees detailed or targeted aspects of operating the memory array 116. For example, the array controller 128 can provide a communication interface between the processor 122 and the memory array 116 (e.g., the components therein). The array controller 128 can function as a multiplexer/demultiplexer, such as for handling transport of data along serial connection to flash devices in the memory array 116.

In controlling the operations of the memory system 102, the memory system controller 114 (via, e.g., the processor 122 and the embedded memory 124) can implement a Flash Translation Layer (FTL) 130. The FTL 130 can include a set of functions or operations that provide translations for the memory array 116 (e.g., the Flash devices therein). For example, the FTL 130 can include the logical-physical address translation, such as by providing the mapping between virtual or logical addresses used by the operating system to the corresponding physical addresses that identify the Flash device and the location therein (e.g., the layer, the page, the block, the row, the column, etc.). Also, the FTL 130 can include a garbage collection function that extracts useful data from partially filed units (e.g., memory blocks) and combines them to a smaller set of memory units. The FTL 130 can include other functions, such as wear-leveling, bad block management, concurrency (e.g., handling concurrent events), page allocation, error correction code (e.g., error recovery), or the like.

3D Storage Architecture

Figure 2:
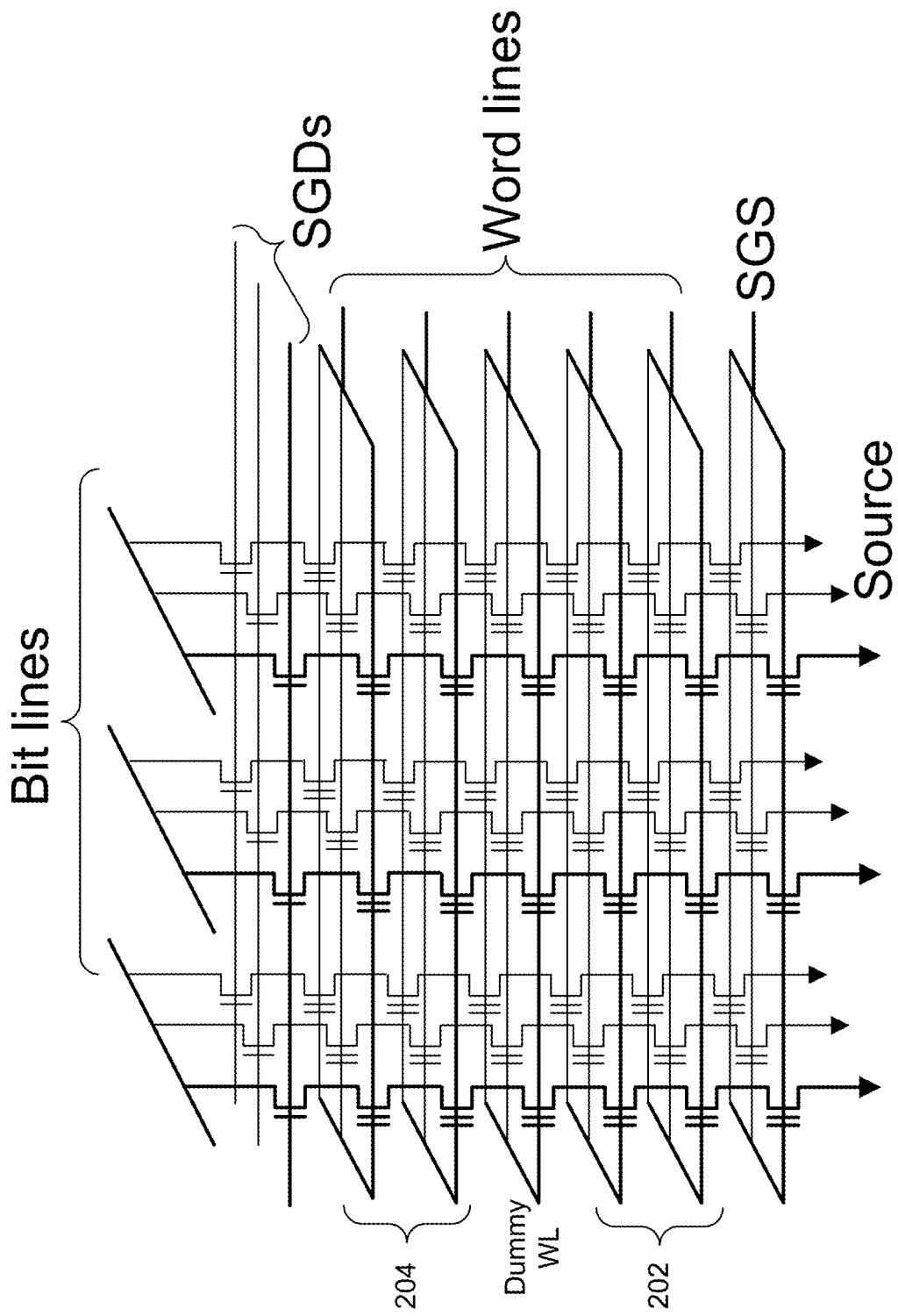
FIG. 2 is an illustration of a three-dimensional (3D) memory architecture in accordance with an embodiment of the present technology.

In some embodiments, the memory system 102 can include a 3D NAND system. The memory array 116 can include 3D NAND packages, and the memory system controller 114 can be configured accordingly. FIG. 2 is an illustration of a 3D memory architecture in accordance with an embodiment of the present technology. The 3D memory architecture can have the memory cells arranged along multiple stacked planes or horizontal layers. The memory planes may be connected using vertical channels. For the example illustrated in FIG. 2, the NAND packages within the memory array 116 can include bit lines extending vertically and across the stacked planes. The NAND packages can further include drain-end select gates (SGDs) at a top portion/layer and source-end select gates (SGSs) at a bottom portion/layer. The layers between the SGDs and correspond to the word lines and the layers of memory cells. The 3D NAND packages can include 64, 88, 96, 256, or 512 layers or more.

The 3D NAND layers may be further grouped into two or more decks, which may be separated or defined by dummy word lines (e.g., one dummy layer) disposed between the adjacent decks. The different decks can provide physical subgroupings within functional groupings, such as memory blocks and/or pages. For example, each memory block (e.g., QLC blocks) may be separated into halves for a two-deck 3D NAND architecture.

Based on the subgroupings, memory cells within a given functional grouping may be operated on at different times. Continuing with the example, a first deck 202 (e.g., the lower deck) of a QLC block may be programmed initially, and a second deck 204 (e.g., the upper deck) of the QLC block may be programmed after a processing delay. In some embodiments, the processing delay can correspond to a real-time demand or usage of the memory system 102. For example, the processing delay can correspond to the duration needed for write data to fill the cache memory (e.g., SLC memory) to a predetermined threshold amount that triggers a background data transfer from the cache memory to the QLC block. Accordingly, the processing delay may be unpredictable and may persist for relatively long periods of time, such as in hours. With the block remaining open during such long durations, the initially programmed set of memory cells can experience charge loss (e.g., loss of electrons from charge layer). Such charge loss can create an imbalance in the charge levels across the different decks within the same functional grouping.

Figure 3A:
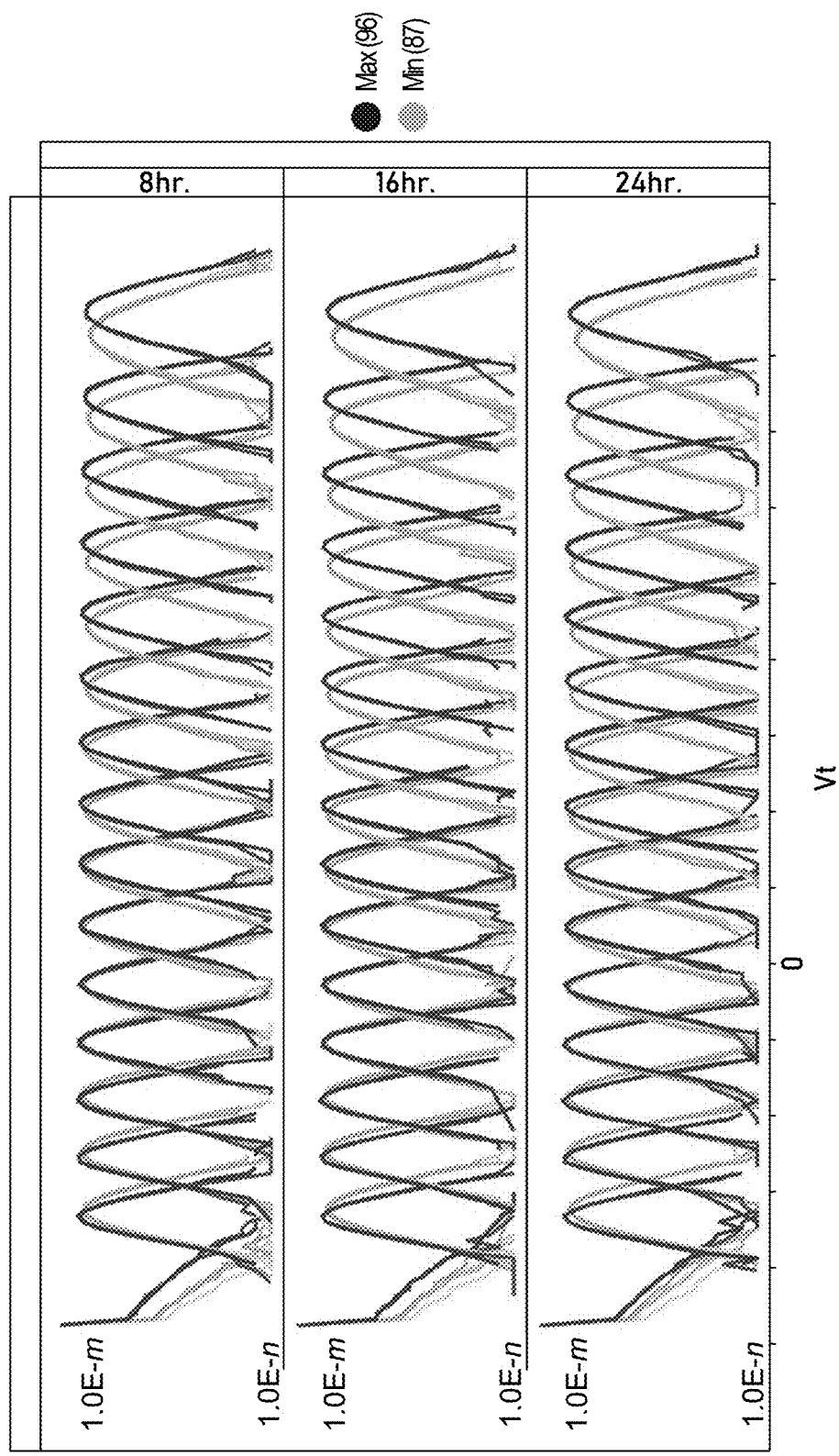
FIG. 3A is an illustration of changes in stored charge levels associated with delayed and unbalanced operations.

FIG. 3A is an illustration of changes in stored charge levels associated with delayed and unbalanced operations. FIG. 3A illustrates the threshold voltage (Vt) distribution for upper and lower decks corresponding to different processing delays (e.g., 8, 16, and 24 hours). As the set of graphs show, the charge loss in the earlier-programmed cells shift the corresponding Vt distributions farther away (e.g., to the left) from the later-programmed cells as the delay increases.

Figure 3B:
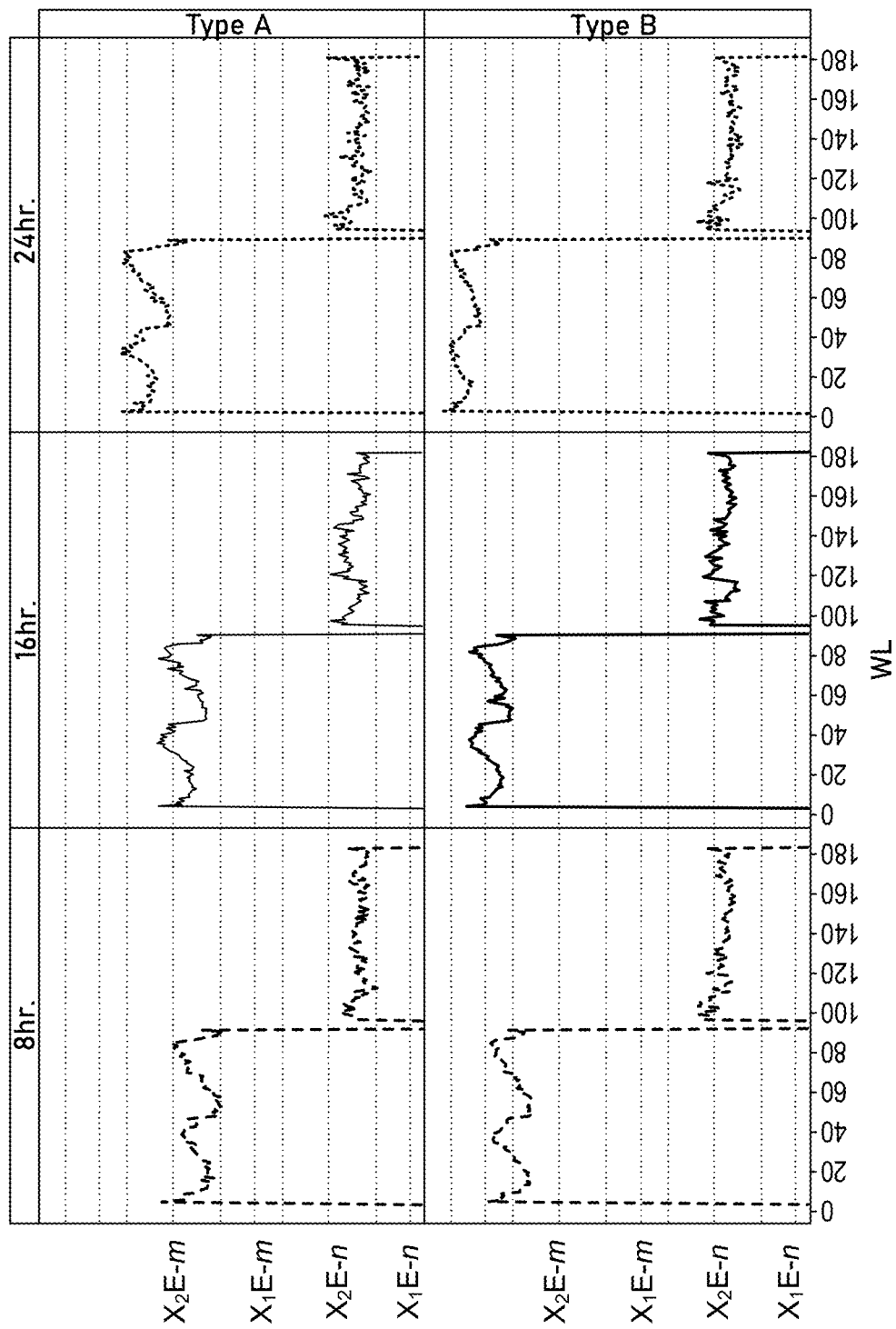
FIG. 3B is an illustration of errors associated with the delayed and unbalanced operations.

Such charge imbalance can cause operating errors (e.g., read errors) when using conventional processes. FIG. 3B is an illustration of errors associated with the delayed and unbalanced operations. FIG. 3B illustrates the raw bit error rate (Rber) associated with different word lines for the processing delays illustrated in FIG. 3A. As FIG. 3B shows, word lines of the first deck 202 correspond to higher Rber measurements than the word lines of the second deck 204. As an illustrative example, conventional memory systems may use a uniform predetermined read level to read the cells within a given block. Such uniform read level may cause read errors, (due to, e.g., erroneously reading from the memory cells in the second deck 204) when the Vt distributions between the different decks are separated by more than a threshold voltage range. In other words, a single read level may be insufficient to account for the deviations in the Vt across the different decks.

As such, the memory system 102 of FIG. 1 (via, e.g., the processor 122 and/or the controller embedded memory 124) can include a read level management mechanism configured to dynamically adjust the read levels across the different decks based on the processing delay (e.g., cross-deck programming delay). Referring back to FIG. 1, the memory system 102 can include a set of different read levels, such as a default read level 152, a dynamic read level 154, and/or a tuning voltage 156. The default read level 152 can correspond to a predetermined read level that may be established during manufacturing or before deployment of the memory system 102. The dynamic read level 154 can correspond to a read level that is derived during deployment/operation of the memory system 102. In some embodiments, the memory system 102 (via, e.g., the memory system controller 114 and/or the memory array 116) can determine the dynamic read level 154 based on applying a voltage pulse and measuring the reaction at the memory cells. For example, the memory system 102 can determine a quantity of bits/memory cells with Vt greater than the applied voltage pulse. Accordingly, the memory system 102 can determine the highest Vt that can be used to compute the dynamic read level 154. The memory system 102 can store the dynamic read level 154 for the corresponding set of memory cells (e.g., for each memory block). The memory system 102 can determine/update the dynamic read level 154 according to a triggering condition, such as a predetermined interval, a targeted operation (e.g., following a read operation), or a combination thereof. The tuning voltage 156 can correspond to a fine-tuning adjustment (e.g., 0-16 mV or 32 mV up or down) to the read level, such as the default read level 152 and/or the dynamic read level 154. The memory system 102 can leverage page-level reads to determine the tuning voltage 156, such as by applying several reads and incrementally adjusting/applying the values or instances of the tuning voltage 156 during the actual read time.

In some embodiments, the memory system 102 can maintain a read offset 158 that tracks adjustments to read voltages (e.g., the default read levels 152). The memory system 102 can periodically perform an internal read function (e.g., a page-level background read for one or more word lines) and use the results thereof to track the Vt position. The memory system 102 can use the tracked Vt position to compute the read offset 158 for the current read voltages associated with the corresponding set of memory cells. In other words, the memory system 102 can use the internal/background read function to track the Vt position, which can be used to calculate an offset to the existing read voltage. The read offset 158 may be calculated based on producing a combined/adjusted optimal read level that corresponds to a targeted condition/result (e.g., lowest error rates). The memory system 102 can store the calculated read offset 158 in an offset table. The memory system 102 may maintain the offset table and the values therein separately from and/or in addition to the dynamic read level 154.

As described above, the processing delay between programming different decks can cause an unbalance in the retained charges across the decks. Accordingly, the memory system 102 can use different combinations of the default read level 152, the dynamic read level 154, the tuning voltage 156, and the read offset 158 to determine unique/independent read levels for each deck, even within the same memory block. For example, the memory system 102 can compute a first read level 162 for a first-programmed deck (e.g., the first deck 202) and a second read level 164 for a subsequently programmed deck (e.g., the second deck 204). When the memory system 102 receives a read command from the host 104, the memory system 102 choose the first read level 162 or the second read level 164 according to the deck associated with the read address.

In one or more embodiments, the memory system 102 can compute the first read level 162 and the second read level 164 using different base values, such as for the default read level 152 and the dynamic read level 154. For example, the memory system 102 can compute the first read level based on the default read level 152 and compute the second read level 164 based on the dynamic read level 154. The memory system 102 may compute the first read level 162 using one or more of the default read level 152, the read offset 158, and the tuning voltage 156 and/or (2) compute the second read level 164 using one or more of the dynamic read level 154 and/or the tuning voltage 156. The memory system 102 can perform the internal reads on one or more word lines (e.g., typical data retention word lines) in the first deck 202. The memory system 102 can periodically update the offset table for the corresponding first deck 202.

In some embodiments, the memory system 102 can compute the first read level 162 and the second read level 164 using different or separately maintained read offset values. For example, the memory system 102 perform the internal reads for one or more word lines in the first deck 202. and the second deck 204. Using the internal read results from the different decks, the memory system 102 can maintain the offset table that tracks separate read offsets (e.g., an upper deck offset and a lower deck offset) for the different decks. Accordingly, the memory system 102 can compute the first read level 162 and the second read level 164 by combining the default read level 152 with the corresponding read offset. In other words, the memory system 102 can (1) compute the first read level 162 based on the default read level 152 and a first/lower deck offset and (2) compute the second read level 164 based on the default read level 152 and a second/upper deck offset. The memory system 102 can apply the tuning voltage 156 in computing the first read level 162 and/or the second read level 164.

In other embodiments, the memory system 102 can compute the first read level 162 and the second read level 164 using the dynamic read level 154 and different or separately maintained read offset values. For example, the memory system 102 perform the internal reads for the first and second decks and maintain the separate corresponding offset values as described above. The memory system 102 can also determine the dynamic read level 154 for the memory block. The memory system 102 can compute one of the first read level 162 and the second read level 164 as the dynamic read level 154 and the other by adjusting the dynamic read level 154 by a difference in the offset values across the deck. In other words, the memory system 102 can compute the second read level 164 based on the dynamic read level 154 and compute the first read level 162 based on combining the dynamic read level 154 with a difference in the offset values across the decks. The memory system 102 can apply the tuning voltage 156 in computing the first read level 162 and/or the second read level 164.

Figure 4:
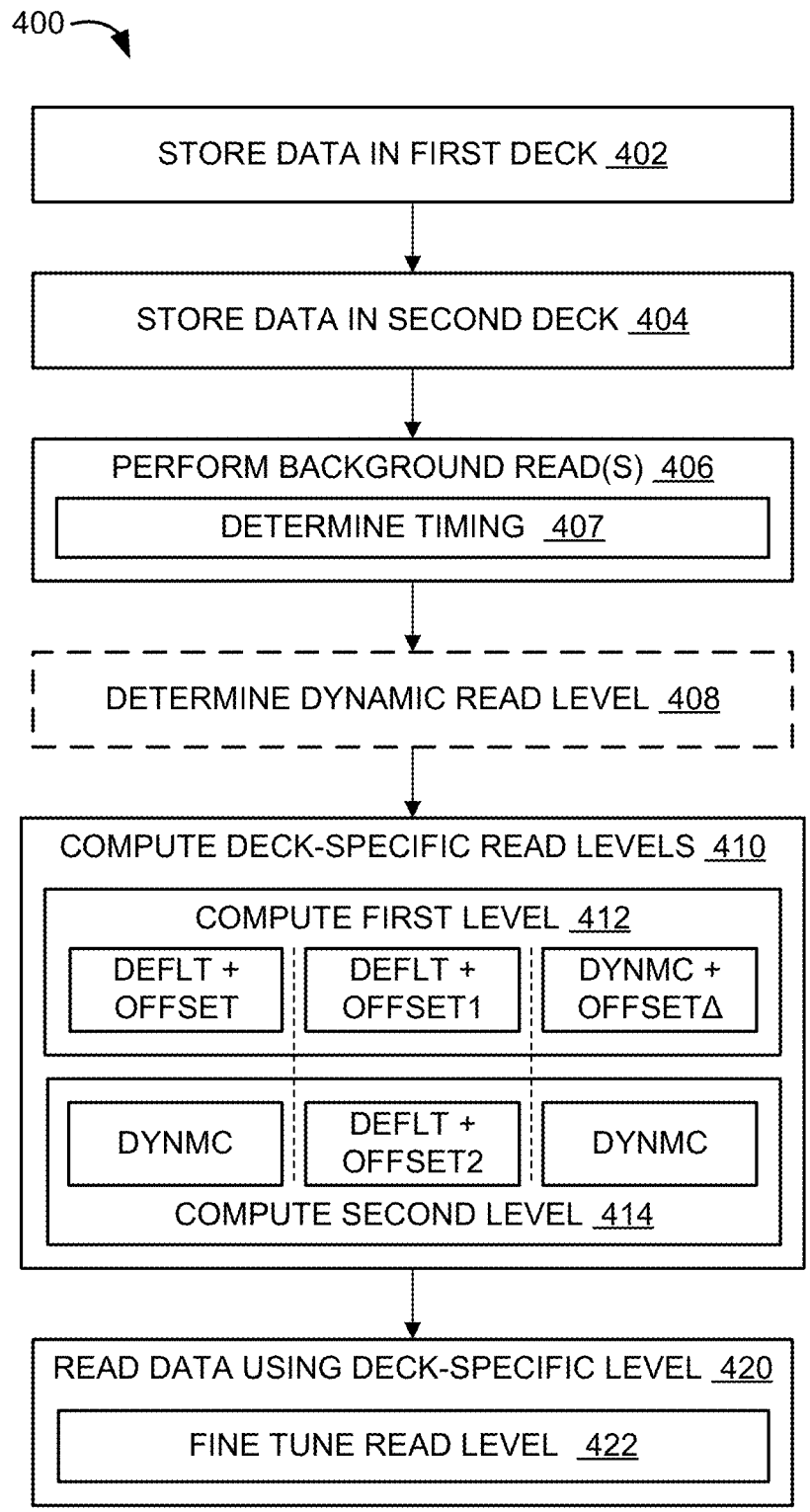
FIG. 4 is a flow diagram illustrating an example method of operating an apparatus in accordance with an embodiment of the present technology.

FIG. 4 is a flow diagram illustrating an example method 400 of operating an apparatus (e.g., the computing system 100, the memory system 102, and/or the memory system controller 114, all illustrated in FIG. 1) in accordance with an embodiment of the present technology. The method 400 can be for computing and implementing different/independent read levels across the different decks.

At block 402, the apparatus can store or program data in the first deck 202 (e.g., the lower deck). At block 404, the apparatus can store data in the second deck 204 (e.g., the upper deck). The apparatus can store a second set of data to the second deck 204 after storing a first set of data to the first deck 202. In some embodiments, the apparatus can initially store write data into cache memory (e.g., SLC cells). When the data written to the cache memory reaches a threshold amount, the memory system 102 can transfer the data from the cache memory to the QLC storage cell. Accordingly, the second set of data can be written to the second deck 204 after a delay that corresponds to a duration associated with the incoming write data reaching the cache memory threshold. As described above, the delay can cause an imbalance in the charge loss and the resulting stored charge levels. In other words, the first deck 202 can experience greater charge loss than the second deck 204 due to the delay in writing to the second deck 204.

At block 406, the memory system 102 can perform internal/background reads of the stored data. The memory system 102 can read the data stored on the first deck 202, the second deck 204, or both and maintain corresponding parameters for the read level adjustment. For example, the memory system 102 can read the stored data using the default read level 152 of FIG. 1 or a derivation thereof, such as the last-used read level for the corresponding memory location. In some embodiments, the memory system 102 can determine a feedback metric, such as error rates, associated with the internal reads. The memory system 102 can use the feedback metric to update the current read level (by, e.g., increasing or decreasing by a predetermined amount) for subsequent read operations. Accordingly, the memory system 102 can identify the read level for the memory location/unit (e.g., memory block) that provides a targeted condition, such as by minimizing the read error rate. The memory system 102 can calculate the corresponding read offset 158 of FIG. 1 as a difference between the optimized read level and the default read level 152. The memory system 102 can store the calculated read offset 158 in the read offset table. The memory system 102 can store the read offsets 158 for the first deck 202, the second deck 204, or both. In some embodiments, the memory system 102 can store a difference in the read offsets 158 between the first and second decks.

The memory system 102 can perform the background reads according to a timing or a trigger. At block 407, the memory system 102 can determine the timing for performing the background reads. In some embodiments, the memory system 102 can determine the timing by accessing a preset interval or frequency for performing the background reads. Accordingly, the memory system 102 can perform the background reads periodically or according to a fixed interval. In other embodiments, the memory system 102 can dynamically determine the timing based on one or more performance metrics or conditions. For example, the memory system 102 can dynamically calculate the internal read frequency or dynamically trigger the background reads based on an error measure (e.g., bit error rate, error recovery triggers, or the like), a measured time between writes to the first and second decks, an incoming command, or a combination thereof. The memory system 102 can increase the read frequency when the error rate is greater than a threshold, decrease the frequency when the write delays are below a delay threshold/range, etc.

In some embodiments, as illustrated at block 408, the memory system 102 can determine the dynamic read level 154 of FIG. 1. The memory system 102 can determine the dynamic read level 154 for a set of memory cells (e.g., a memory block) by applying one or more voltage pulses or by successively increasing the applied voltage to one or more word lines for the set. As a result, the memory system 102 can identify the highest Vt for or within the set of memory cells. The memory system 102 can compute the dynamic read level 154 using the highest Vt, such as according to a predetermined equation or process. In other embodiments, the memory system 102 can operate without the dynamic read level 154, such as by using the default read level 152 and different offsets as described below.

At block 410, the memory system 102 can compute deck-specific read levels. In other words, the memory system 102 can (1) compute the first read level 162 of FIG. 1 configured for reading the first deck 202 of memory cells as illustrated at block 412 and (2) compute the second read level 164 of FIG. 1 configured for reading the second deck 204 of memory cells. The memory system 102 can use unique, different, and/or independent combinations of the default read level 152, the dynamic read level 154, one or more of the read offsets 158, the tuning voltage 156, or a combination thereof the compute the first and second read levels. As such, the resulting first and second read levels can be independent of each other and depend on a real-time condition of the stored charge levels in the memory cells of the corresponding deck. Thus, the memory system 102 can use the first and second read levels to account for the different charge loss levels between the first and second decks resulting from the processing delay in writing the second deck 204 after the first deck 202.

As a first example of the unique combinations, in some embodiments, the memory system 102 can perform the background reads and maintain the read offset 158 for the first deck 202 (e.g., the lower deck). The memory system 102 can compute the first read level 162 based on combining or adjusting the default read level 152 with the read offset 158 for the first deck 202. The memory system 102 can compute the second read level 164 based on the dynamic read level 154. In a second example set of embodiments, the memory system 102 can perform the background reads and maintain separate read offsets 158 (e.g., first and second read offsets) for the first deck 202 and the second deck 204. Accordingly, the memory system 102 can (1) compute the first read level 162 based on the default read level 152 and the first offset for the first deck 202 and (2) compute the second read level 164 based on the default read level 152 and the second offset for the second deck 204. In a third example set of embodiments, the memory system 102 can background reads and maintain separate read offsets 158 or a corresponding difference for the first deck 202 and the second deck 204. Accordingly, the memory system 102 can (1) compute the first read level 162 based on the dynamic read level 154 and the difference between the first and second offsets and (2) compute the second read level 164 based on the dynamic read level 154 (e.g., without the offset).

At block 420, the memory system 102 can read stored data using the deck-specific read level. The memory system 102 can perform the read in response to a corresponding command from the host 104 of FIG. 1. The memory system 102 can further receive a read address (e.g., a virtual address) from the host 104. The memory system 102 can process the received command using the FTL 130 of FIG. 1 to access the data stored at the corresponding location within the memory array 116 of FIG. 1. As a part of the process, the memory system 102 can identify the deck(s) that includes the targeted memory location/cells. The memory system 102 can use the deck identification to access the corresponding deck-specific read level (e.g., the first read level 162 or the second read level 164). The memory system 102 can use the deck-specific read level to perform the read operation.

In some embodiments, as illustrated at block 422, the memory system 102 can fine tune the deck-specific read level. For example, the memory system 102 can use the initially computed read level (e.g., the first read level 162 or the second read level 164 resulting from block 410) for initial leveling. Afterwards, the memory system 102 can fine tune the read level using the tuning voltage 156. The memory system 102 can apply multiple reads/tuning adjustments to fine tune the voltage.

The memory system 102 computing and using deck-specific read levels (e.g., the first and second read levels that are different and used to read from the first and second decks, respectively) can account for real-time conditions associated with the data retention shift related to the charge losses occurring during the delay between writes to the different decks. Accordingly, the memory system 102 can provide reduced error rates, increased data integrity, and increased read efficiencies via the deck-specific read levels. Moreover, the memory system 102 can leverage one or more existing processes, such as the background reads, the read offset maintenance, or the like, to compute the deck-specific read levels. Accordingly, the memory system 102 can provide the benefits using minimal additional processing, circuitry, and other resources. Further, the memory system 102 can provide the benefits without affecting the quality of service (QoS) measure for the memory system 102.

Figure 5:
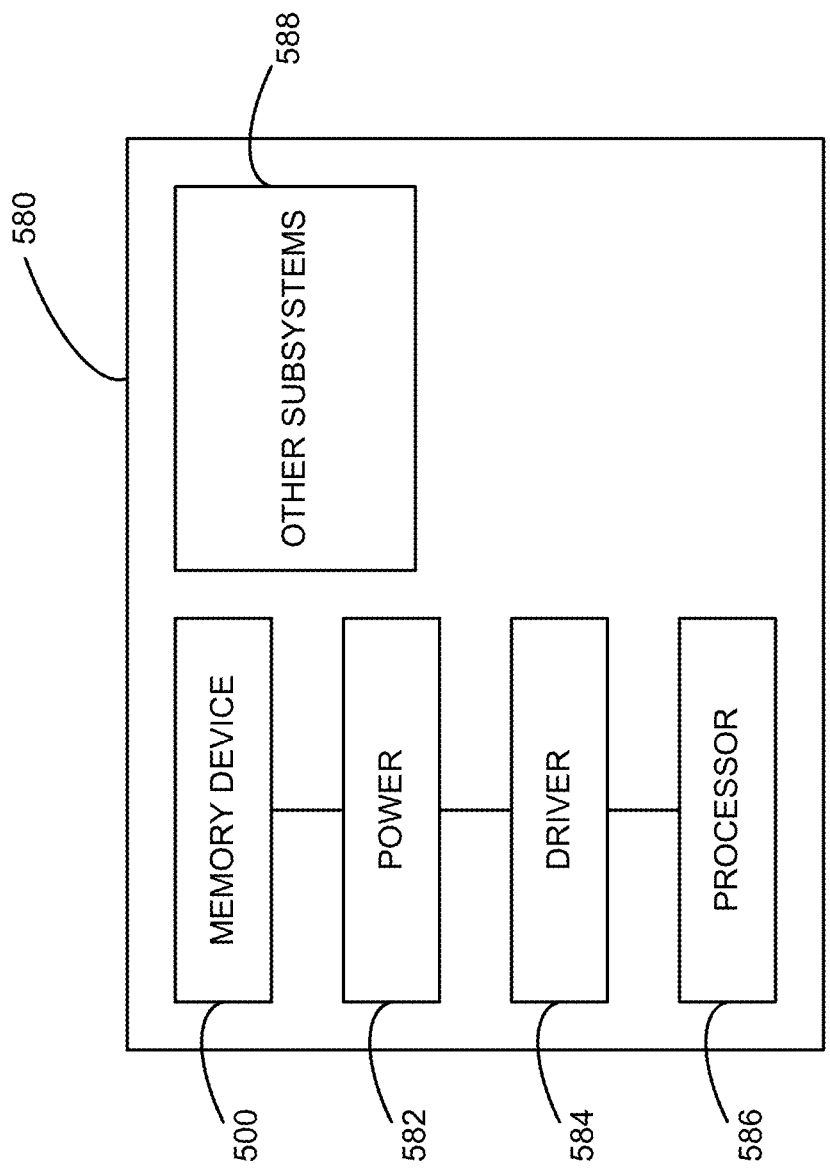
FIG. 5 is a schematic view of a system that includes an apparatus in accordance with an embodiment of the present technology.

FIG. 5 is a schematic view of a system that includes an apparatus in accordance with embodiments of the present technology. Any one of the foregoing apparatuses (e.g., memory devices) described above with reference to FIGS. 2-5 can be incorporated into any of a myriad of larger and/or more complex systems, a representative example of which is system 580 shown schematically in FIG. The system 580 can include a memory device 500, a power source 582, a driver 584, a processor 586, and/or other subsystems or components 588. The memory device 500 can include features generally similar to those of the apparatus described above with reference to one or more of the FIGS, and can therefore include various features for performing a direct read request from a host device. The resulting system 580 can perform any of a wide variety of functions, such as memory storage, data processing, and/or other suitable functions. Accordingly, representative systems 580 can include, without limitation, hand-held devices (e.g., mobile phones, tablets, digital readers, and digital audio players), computers, vehicles, appliances and other products. Components of the system 580 may be housed in a single unit or distributed over multiple, interconnected units (e.g., through a communications network). The components of the system 580 can also include remote devices and any of a wide variety of computer readable media.

From the foregoing, it will be appreciated that specific embodiments of the technology have been described herein for purposes of illustration, but that various modifications may be made without deviating from the disclosure. In addition, certain aspects of the new technology described in the context of particular embodiments may also be combined or eliminated in other embodiments. Moreover, although advantages associated with certain embodiments of the new technology have been described in the context of those embodiments, other embodiments may also exhibit such advantages and not all embodiments need necessarily exhibit such advantages to fall within the scope of the technology. Accordingly, the disclosure and associated technology can encompass other embodiments not expressly shown or described herein.

In the illustrated embodiments above, the apparatuses have been described in the context of NAND Flash devices. Apparatuses configured in accordance with other embodiments of the present technology, however, can include other types of suitable storage media in addition to or in lieu of NAND Flash devices, such as, devices incorporating NOR-based non-volatile storage media (e.g., NAND flash), magnetic storage media, phase-change storage media, ferroelectric storage media, dynamic random access memory (DRAM) devices, etc.

The term "processing" as used herein includes manipulating signals and data, such as writing or programming, reading, erasing, refreshing, adjusting or changing values, calculating results, executing instructions, assembling, transferring, and/or manipulating data structures. The term data structure includes information arranged as bits, words or code-words, blocks, files, input data, system-generated data, such as calculated or generated data, and program data. Further, the term "dynamic" as used herein describes processes, functions, actions or implementation occurring during operation, usage, or deployment of a corresponding device, system or embodiment, and after or while running manufacturer's or third-party firmware. The dynamically occurring processes, functions, actions or implementations can occur after or subsequent to design, manufacture, and initial testing, setup or configuration.

The above embodiments are described in sufficient detail to enable those skilled in the art to make and use the embodiments. A person skilled in the relevant art, however, will understand that the technology may have additional embodiments and that the technology may be practiced without several of the details of the embodiments described above with reference to one or more of the FIGS. described above.

We claim:

1. A memory device, comprising:
  a memory array including memory cells configured to store data, wherein the memory cells are grouped into at least a first deck and a second deck; and
  a memory system controller operably coupled to the memory array and configured to—
    program the first deck before the second deck;
    determine one or more read levels or adjustments thereto based on results of one or more background reads,
      wherein the one or more read levels or adjustments thereto include (1) a default read level representing a preset read level configured for use across the first and second decks, (2) one or more offset levels dynamically determined for adjusting the default read level according to the results of the one or more background reads, and/or (3) a dynamic read level derived according to one or more real-time characteristics of the memory array;
    based on the determined one or more read levels or adjustments, compute a unique read level for each of the first and second decks, wherein the unique read level for each of the first and second decks is computed using a combination of the default read level, the one or more offset levels and/or the dynamic read level; and
    perform a read operation according to the unique read level associated with a deck that corresponds to a read address.

2. The memory device of claim 1, wherein the memory system controller is configured to compute a set of the unique read levels including (1) a first read level for reading from the first deck and (2) a second read level for reading from the second deck, wherein the first read level is independent from the second read level.

3. The memory device of claim 2, wherein:
  the memory array includes a three-dimensional (3D) Flash architecture having the first and second decks;
  the memory cells are grouped into memory blocks that each include at least the first deck and the second deck;
  the first read level is configured to read from the first deck within a memory block; and
  the second read level is configured to read from the second deck within the memory block.

4. The memory device of claim 1, wherein the unique read level is computed based on further adjusting the combination by increasing or decreasing by a fine tune voltage.

5. The memory device of claim 1, wherein the memory system controller is configured to:
  determine a highest threshold voltage within a block of memory cells based on applying one or more voltage pulses to the memory block, wherein the memory block include the first and second decks;
  determine the dynamic read level for the memory block based on the highest threshold voltage;
  perform a set of background reads on the first deck within the block using the default read level and/or one or more derivations thereof;
  determine an offset level according to the set of background reads, wherein the offset level corresponds to an adjustment to the default read level that meets a targeted condition;
  compute a first read level based on the default read level and the offset level, wherein the first read level for reading from the first deck; and
  compute a second read level based on the dynamic read level, wherein the second read level for reading from the second deck.

6. The memory device of claim 1, wherein the memory system controller is configured to:
  perform background reads on the first deck and the second deck using the default read level and/or one or more derivations thereof;
  determine a first offset level according to a first set of background reads on the first deck, wherein the first offset level corresponds to a first adjustment to the default read level that meets a targeted condition for the first set of background reads;
  determine a second offset level according to background reads on the second deck, wherein the second offset level corresponds to a second adjustment to the default read level that meets the targeted condition for the second set of background reads;
  compute a first read level based on the default read level and the first offset level, wherein the first read level for reading from the first deck; and
  compute a second read level based on the default read level and the second offset level, wherein the second read level is for reading from the second deck.

7. The memory device of claim 1, wherein the memory system controller is configured to:
  determine the dynamic read level for a memory block according to a highest threshold voltage within a block of memory cells, wherein the memory block include the first and second decks;
  perform background reads on the first deck and the second deck using the default read level and/or one or more derivations thereof;

determine a first offset level according to a first set of background reads on the first deck, wherein the first offset level corresponds to a first adjustment to the default read level that meets a targeted condition for the first set of background reads;

determine a second offset level according to background reads on the second deck, wherein the second offset level corresponds to a second adjustment to the default read level that meets the targeted condition for the second set of background reads;

compute a first read level based on the dynamic read level and a difference between the first and second offset level, wherein the first read level is for reading from the first deck; and compute a second read level based on the dynamic read level, wherein the second read level is for reading from the second deck.

8. The memory device of claim 1, wherein the memory system controller is configured to:

perform background reads according to a preset interval; and determine the one or more read levels or adjustments thereto based on the background reads.

9. The memory device of claim 1, wherein the memory system controller is configured to:

dynamically determine a background read timing based on an error rate, an incoming command, a delay between writes to the first and second decks, or a combination thereof;

perform background reads according to the dynamically determined background read timing; and determine the one or more read levels or adjustments thereto based on the background reads.

10. A memory controller, comprising:

at least one processor;

embedded memory coupled to the processor and storing instructions for execution by the at least one processor, the instructions comprising— controlling operations of a memory array to store first data into memory cells belonging to a first deck of a memory block within the memory array;

controlling operations of the memory array to store second data into memory cells belonging to a second deck of the memory block, wherein the second data is written after the first data;

performing background reads for the first data, the second data, or both;

determining one or more read levels or adjustments thereto based on the background reads, wherein the one or more read levels or adjustments thereto include (1) a default read level representing a preset read level configured for use across the first and second decks, (2) one or more offset levels dynamically determined for adjusting the default read level according to the results of the background reads, and/or (3) a dynamic read level derived according to one or more real-time characteristics of the memory array; and based on the one or more read levels or adjustments thereto, computing (1) a first read level for reading the first data from the first deck and (2) a second read level for reading the second data from the second deck, wherein the first read level is independent of the second read level and accounts for different charge loss levels between the first and second decks associated with delayed write to the second deck, and wherein computing the first and second read levels include generating different combinations of the default read level, the one or more offset levels, and/or the dynamic read level.

11. The memory controller of claim 10, wherein the processor instructions include:

determining the dynamic read level for the memory block according to a highest threshold voltage within the memory block;

determining an offset value according to a set of background reads on the on the first deck, wherein the offset value corresponds to an adjustment to the default read level that meets a targeted condition; and computing (1) the first read level based on the default read level and the offset level and (2) the second read level based on the dynamic read level.

12. The memory controller of claim 10, wherein the processor instructions include:

using the default read level and/or one or more derivations thereof, performing (1) a first set of background reads on the first deck and (2) a second set of background reads on the second deck;

determining (1) a first offset level according to the first set of background reads and (2) a second offset level according to the second set of background reads, wherein the first and second offset levels correspond to independent adjustment to the default read level that meets a targeted condition for the first and second sets of background reads; and computing (1) the first read level based on the default read level and the first offset level and (2) the second read level based on the default read level and the second offset level.

13. The memory controller of claim 10, wherein the processor instructions include:

determining the dynamic read level for the memory block according to a highest threshold voltage within the memory block;

determining (1) a first offset level according to the first set of background reads and (2) a second offset level according to the second set of background reads, wherein the first and second offset levels correspond to independent adjustment to the default read level that meets a targeted condition for the first and second sets of background reads; and computing (1) the first read level based on the dynamic read level and a difference between the first and second offset level and (2) the second read level based on the dynamic read level.

14. A method of operating a memory array that includes memory cells are grouped into at least a first deck and a second deck, the method comprising:

performing background reads for data stored in the first deck, the second deck, or both;

determining a dynamic read level for the memory block according to a highest threshold voltage within a memory block;

based on the background reads, determining one or more read levels or adjustments thereto including determining an offset value according to the background reads on the first deck, wherein the offset value corresponds to an adjustment to a default read level that meets a targeted condition, and wherein default read level represents a preset read level configured for use across the first and second decks; and based on the one or more read levels or adjustments thereto, computing (1) a first read level based on the default read level and the offset level for reading the first data from the first deck and (2) a second read level based on the dynamic read level for reading the second data from the second deck, wherein the first read level is independent of the second read level and accounts for different charge loss levels at the first and second decks in association with a delay in writes to the first and second decks.

15. The method of claim 14, wherein further comprising:

determining the offset value includes determining (1) a first offset level according to a first set of background reads and (2) a second offset level according to a second set of background reads, wherein the first and second offset levels correspond to independent adjustment to a default read level that meets a targeted condition for the first and second sets of background reads;

performing the background reads includes using the preset read level and/or one or more derivations thereof to perform (1) the first set of background reads on the first deck and (2) the second set of background reads on the second deck;

the first read level is computed based on the default read level and the first offset level; and the second read level is computed based on the default read level and the second offset level.

16. The method of claim 14, wherein determining the offset value includes determining (1) a first offset level according to a first set of background reads and (2) a second offset level according to a second set of background reads, wherein the first and second offset levels correspond to independent adjustment to a default read level that meets a targeted condition for the first and second sets of background reads;

performing the background reads includes using the preset read level and/or one or more derivations thereof to perform (1) the first set of background reads on the first deck and (2) the second set of background reads on the second deck; and the first read level is computed based on the dynamic read level and a difference between the first and second offset level, and the second read level is computed based on the dynamic read level.

17. The method of claim 14, further comprising:

dynamically determining a background read timing based on an error rate, an incoming command, a delay between writes to the first and second decks, or a combination thereof;

wherein the background reads are performed according to the dynamically determined background read timing; and the first and second read levels are computed according to the dynamically triggered background reads.

* * * * *